(12) United States Patent
Levinson et al.

(10) Patent No.: US 7,832,857 B2
(45) Date of Patent: Nov. 16, 2010

(54) MICROBIAL CELLULOSE CONTACT LENS

(76) Inventors: Dennis J. Levinson, 2737 Summit Dr., Glenview, IL (US) 60025; Thomas Glonek, 803 Highland Ave., Oak Park, IL (US) 60304

( * ) Notice: Subject to any disclaimer, the term of this patent is extended or adjusted under 35 U.S.C. 154(b) by 0 days.

(21) Appl. No.: 12/229,073

(22) Filed: Aug. 18, 2008

(65) Prior Publication Data
US 2010/0039612 A1 Feb. 18, 2010

(51) Int. Cl.
G02C 7/04 (2006.01)
(52) U.S. Cl. .............................. 351/160 H; 351/160 R
(58) Field of Classification Search ... 351/160 R–160 H
See application file for complete search history.

(56) References Cited

U.S. PATENT DOCUMENTS

| | | | |
|---|---|---|---|
| 4,378,431 A | 3/1983 | Brown, Jr. |
| 4,506,010 A | 3/1985 | Goodman et al. |
| 4,588,400 A | 5/1986 | Ring et al. |
| 4,655,758 A | 4/1987 | Ring et al. |
| 4,788,146 A | 11/1988 | Ring et al. |
| 4,863,565 A | 9/1989 | Johnson et al. |
| 4,891,317 A | 1/1990 | Brown, Jr. et al. |
| 4,912,049 A | 3/1990 | Farah |
| 4,929,550 A | 5/1990 | Byrom |
| 4,942,128 A | 7/1990 | Brown, Jr. |
| 4,954,439 A | 9/1990 | Brown, Jr. et al. |
| 4,990,031 A | 2/1991 | Blowes et al. |
| 5,102,872 A | 4/1992 | Singh et al. |
| 5,114,849 A | 5/1992 | Ben-Bassat et al. |
| 5,207,826 A | 5/1993 | Westland et al. |
| 5,273,891 A | 12/1993 | Byrom |
| 5,350,528 A | 9/1994 | Westland et al. |
| 5,351,103 A | 9/1994 | Komatsu et al. |
| 5,360,723 A | 11/1994 | Hyatt et al. |
| 5,362,713 A | 11/1994 | Westland et al. |
| 5,400,105 A | 3/1995 | Koboshi et al. |
| 5,452,045 A | 9/1995 | Koboshi et al. |
| 5,460,926 A | 10/1995 | Komatsu et al. |
| 5,552,851 A | 9/1996 | Koboshi et al. |
| 5,580,348 A | 12/1996 | Blaney et al. |
| 5,772,646 A | 6/1998 | Blaney et al. |
| 5,780,211 A | 7/1998 | Komatsu et al. |
| 5,783,537 A | 7/1998 | Ahmed et al. |
| 5,806,153 A | 9/1998 | Dolan et al. |
| 5,846,213 A | 12/1998 | Wan |
| 5,955,326 A | 9/1999 | Bungay, III et al. |
| 5,975,095 A | 11/1999 | Ahmed et al. |
| 6,020,293 A | 2/2000 | Ahmed et al. |
| 6,071,727 A | 6/2000 | Bungay et al. |
| 6,112,380 A | 9/2000 | Dolan et al. |
| 6,149,962 A | 11/2000 | Loh et al. |
| 6,261,674 B1 | 7/2001 | Branham et al. |
| 6,426,189 B1 | 7/2002 | Helbert et al. |
| 6,433,161 B1 | 8/2002 | Cheng et al. |
| 6,534,294 B1 | 3/2003 | Lee et al. |
| 6,541,238 B1 | 4/2003 | Saxena et al. |
| 6,599,518 B2 | 7/2003 | Oster et al. |
| 6,613,528 B2 | 9/2003 | Helbert et al. |
| 6,800,753 B2 | 10/2004 | Kumar |
| 6,835,560 B2 | 12/2004 | Greene |
| 6,838,399 B1 | 1/2005 | Deka et al. |
| 6,986,963 B2 | 1/2006 | Evans et al. |
| 7,390,499 B2 | 6/2008 | Serafica et al. |
| 2003/0013163 A1 | 1/2003 | Klemm et al. |
| 2003/0203012 A1 | 10/2003 | Serafica et al. |
| 2004/0014197 A1 | 1/2004 | Huisman et al. |
| 2004/0028722 A1 | 2/2004 | Serafica et al. |
| 2004/0142019 A1 | 7/2004 | Serafica et al. |
| 2004/0161453 A1 | 8/2004 | Serafica et al. |
| 2005/0019380 A1 | 1/2005 | Hoon et al. |
| 2005/0037082 A1* | 2/2005 | Wan et al. .................... 424/488 |
| 2005/0042250 A1 | 2/2005 | Damien et al. |
| 2006/0240084 A1 | 10/2006 | Serafica et al. |
| 2006/0286434 A1 | 12/2006 | Evans et al. |
| 2007/0037897 A1 | 2/2007 | Wang et al. |
| 2007/0053960 A1 | 3/2007 | Brown et al. |
| 2007/0054880 A1 | 3/2007 | Saferstein et al. |
| 2007/0128243 A1 | 6/2007 | Serafica et al. |
| 2007/0213522 A1 | 9/2007 | Harris et al. |
| 2007/0296914 A1 | 12/2007 | Hong et al. |
| 2008/0044456 A1 | 2/2008 | de Souza |
| 2008/0064072 A1 | 3/2008 | Wan et al. |
| 2008/0102217 A1 | 5/2008 | Lin |
| 2008/0113413 A1* | 5/2008 | Nobles et al. ................. 435/72 |
| 2009/0054171 A1 | 2/2009 | Lee |

FOREIGN PATENT DOCUMENTS

| | | |
|---|---|---|
| WO | WO 89/11783 | 12/1989 |
| WO | WO 89/12107 | 12/1989 |
| WO | WO 92/07946 | 5/1992 |
| WO | WO 97/05271 | 2/1997 |
| WO | WO 2007/091801 A1 | 8/1997 |
| WO | WO 97/31544 | 9/1997 |
| WO | WO 99/50389 | 10/1999 |
| WO | WO 99/61482 | 12/1999 |

(Continued)

Primary Examiner—Darryl J Collins
(74) Attorney, Agent, or Firm—Rockey, Depke & Lyons, LLC

(57) ABSTRACT

The present invention provides a contact lens from *Gluconacetobacter xylinus* cellulose material.

10 Claims, No Drawings

FOREIGN PATENT DOCUMENTS

| | | |
|---|---|---|
| WO | WO 01/61026 A1 | 8/2001 |
| WO | WO 03/090640 A2 | 11/2003 |
| WO | WO 03/090640 A3 | 11/2003 |
| WO | WO 2004/064880 A1 | 8/2004 |
| WO | WO 2005/009276 A2 | 2/2005 |
| WO | WO 2005/009276 A3 | 2/2005 |
| WO | WO 2005/018435 A2 | 3/2005 |
| WO | WO 2006/017729 A2 | 2/2006 |
| WO | WO 2006/113796 A2 | 10/2006 |
| WO | WO 2006/113796 A3 | 10/2006 |
| WO | WO 2007/027849 A2 | 3/2007 |
| WO | WO 2007/064772 A2 | 6/2007 |
| WO | WO 2007/064772 A3 | 6/2007 |
| WO | WO 2007/064881 A2 | 6/2007 |
| WO | WO 2007/064881 A3 | 6/2007 |
| WO | WO 2007/100353 A2 | 9/2007 |
| WO | WO 2007/106251 | 9/2007 |
| WO | WO 2007/146946 | 12/2007 |
| WO | WO 2008/040729 A2 | 4/2008 |
| WO | WO 2008/040729 A3 | 4/2008 |

* cited by examiner

MICROBIAL CELLULOSE CONTACT LENS

FIELD OF THE INVENTION

The present invention relates to microbial cellulose materials having a convex surface that molds to the shape of the eye covering the cornea and limbus and can be corrective or non-corrective of vision.

BACKGROUND

Contact lenses are widely used to correct vision defects in mammalian wearers of the lenses. Vision defects include, for example, myopia, hyperopia, astigmatism, and presbyopia. Contact lenses can come in hard and soft varieties. Typically the hard variety is made from glass or a rigid polymer such as, for example, poly (methyl methacrylate) (PMMA), poly (hydroxyethyl methacrylate) (HEMA) and polycarbonates. The soft lenses are usually made from a polymeric material.

Contact lenses have various corrective types, such as, single vision, bifocal, trifocal, and progressive. When contact lenses are placed in the eye, a tear layer separates the lens from the surface of the eye. This layer is commonly known as the tear film. The tear film contains water, proteins, lipids, sodium, calcium, bicarbonate, and enzymes. A contact lens can disrupt the tear film by repelling water due to its hydrophobic nature, which can lead to discomfort for the wearer. The disruption in the tear film also can lead to the deposit of albumin on the lens, thus, reducing the effectiveness of the film. Prior-art attempts to mitigate the effects caused by hydrophobic lens material led to coating the hydrophobic material with a hydrophilic polymeric layer. Contact lenses that aggravate the dry eye condition are not recommended for extended use.

Because most lens materials are formed using monomers and cross-linking agents, which have electrostatic charges associated therewith, proteins, which also have charge distributions, are attracted to the lens. This can cause the lens to turn yellow in color and can reduce the corrective effects of the lens. Such a lens is not sufficiently biocompatible for extended use.

Because the anterior segment (the surface of the front of the eye, including the cornea) of the human eye does not receive adequate blood flow to supply it with oxygen and to remove carbon dioxide, the eye must have sufficient exposure to air to remain in a healthful condition. Thus, a contact lens must have sufficient permeability to the passage of oxygen to maintain good eye health. Permeability, DK, typically is measured in units of Barrers, where D is the diffusion coefficient, and K is the solubility coefficient. A contact lens should have a permeability, or a DK, of at least 100 Barrers to be suitable for extended use.

The contact lens material also must not pose a health risk and not cause an allergic reaction. The lens also must be sufficiently lightweight to be comfortable to wear and to avoid ocular strain. It is also necessary to be of the appropriate size to function properly and to be comfortable. The lens must also have the proper specific gravity so that the lens does not move around on the eye by floating on the tear film. The lens must also be of sufficient flexibility to conform to the eye surface and be resilient enough for a user of the lens to handle the lens without tearing or scratching. The lens also must have the proper thickness so as not to cause discomfort during blinking or to reduce the blink rate.

Contact lenses can be manufactured using several methods, including lathe cutting, spin casting, and cast molding. In a lathe-cutting process, a polymeric material is polymerized into rod-shaped stock material, that is cut into buttons and mounted in a lathe where it is cut into a lens. In the spin-casting method, reactive polymeric materials are placed in a mold which is rotated. The reactive liquids polymerize to form a solid contact lens. By varying the speed of rotation, the optics of the lens can be varied. In the cast-molding process, reactive monomeric material is placed into a mold. The mold is then cast, and the monomer polymerizes forming a solid lens. The optics of the lens are adjusted by varying the shape of the mold.

All prior art contact lens materials have an amorphous, three-dimensional cross-linked polymer matrix. Hard contact lens materials typically are polymers below their glass transition temperature and include very little or no water. Soft contact lenses are typically made from polymers above their glass transition temperature and have relatively high water content.

DETAILED DESCRIPTION OF THE INVENTION

The contact lens of the present invention is formed from a material containing microbial cellulose (MC). In a preferred form of the invention, the MC may be obtained by biosynthesis through the bacteria of the genus *Gluconacetobacter*. Until recently, this microorganism was known as *Acetobacter xylinum*. However, the phylogeny of acetic acid bacteria, of which *Acetobacter xylinum* is a member, was corrected in 1998 based upon the sequences of 16S ribosomal RNA, and the subgenus *Gluconobacter* was elevated to the generic level. In addition, the original spelling, *Gluconoacetobacter* [sic], has been corrected in accordance with Rule 61 on the occasion of validation to *Gluconacetobacter*. *Acetobacter xylinus* has been transferred to the genus *Gluconacetobacter* and is now recognized as *Gluconacetobacter xylinus* (*G. xylinus*). Microbial cellulose derived from *G. xylinus* is a preferred material for forming contact lenses.

*G. xylinus* cellulose film is available for purchase under the name DERMAFILL from Microbial Cellulose Technology of Northbrook, Ill. The DERMAFILL film is sterile packaged in dry form and is opaque. On wetting with tears or physiological saline solution it becomes transparent. DERMAFILM is believed to be made in accordance with the disclosure in U.S. Pat. No. 4,912,049, which is incorporated herein by reference and made a part hereof.

The *G. xylinus* cellulose is biodegradable, non-toxic, non-pyrogenic, hypoallergenic, and may be sterilized. The material is sufficiently flexible when formed into a contact lens to conform to the shape of an eye. The material also strongly absorbs light within the UV spectral range between 250 to 400 nanometers, and is non-absorbing, and, therefore, transparent in the visible and infrared light ranges above about 400 nanometers. Accordingly, the contact lenses of the present invention are capable of scattering incident laser light and can protect a wearer from laser blinding or ocular tissue damage.

In another preferred form of the invention, the contact lens will be fabricated from a copolymer of the *G. xylinus* cellulose and hioxifilcon B. Hioxifilcon B is a copolymer of 2-hydroxyethyl methacrylate and 2,3-dihydroxypropyl methacrylate.

In a preferred form of the invention, the contact lens of the present invention will be fabricated without requiring a cross-linking step. The contact lenses of the present invention can be formed directly from solid *G. xylinus* cellulose by cutting, molding or stamping the material into the desired shape. The *G. xylinus* cellulose material can be formed into a stock material and then blanks can be removed from the stock material by cutting or other methods, and the blank material can be further formed into the desired shape by cutting, molding or stamping procedures. In a more preferred form of the invention, the blanks will be formed into the desired shape using well known laser cutting and lathing techniques. Suitable stock material includes cellulosic material taken directly from the bacterial preparation or sheets of G. xylinus cellulose material sold under the tradename DERMAFILL™. If the cellulosic material is taken directly from the bacterial preparation, the cellulosic material can be stretched into sheets and suspended over appropriate mandrills while being held in place during drying. After drying is complete, the material will retain its shape even after is has been re-wetted.

It is also contemplated that the G. xylinus cellulose can be formed into the desired shape through a molding process where the G. xylinus cellulose is transferred to a mold in a viscous state or in a viscous vehicle. It is contemplated the G. xylinus cellulose can be heated to a temperature above its glass transition temperature into a molten state and flowed into a mold. Because the G. xylinus cellulose is susceptible to oxidation upon heating, this molding process requires the cellulosic stock material be heated under pressure and/or under a nitrogen gas atmosphere. Excessive temperatures must be avoided, however, because the glucose repeating units will spontaneously rearrange to various furan derivatives destroying the cellulose polymer.

In another preferred form of the invention, the G. xylinus cellulose will be dissolved or suspended in a viscous medium and flowed into the mold. In one preferred form of the invention, dried cellulose stock material is milled into particles having an average particle size under 250 mµ. The milled particles are suspended in the viscous medium producing a glass-like gel having a refractive index similar to that of the medium thereby minimizing light scattering. The glass-like material can be formed in the mold by adding the necessary materials to the mold, or the materials can be mixed together first and then flowed into the mold, or a combination of the two methods where certain materials are combined together first and then flowed into the mold, and additional individual ingredients can be added directly to the mold without prior mixing with other components. The viscous medium can be evaporated to form a solid lens in the desired shape, or another biocompataible material can be added to the gel to cause the cellulose material to harden so that it can be removed from the mold in the desired shape.

In another preferred form of the invention the G. xylinus cellulose will be dissolved in a suitable solvent, flowed into the mold, and then precipitated from the solvent to provide a solid contact lens of the desired shape. The step of precipitating the G. xylinus cellulose can be accomplished by any suitable means that does not damage the contact lens for its intended purpose and can include evaporating off enough of the solvent to precipitate the G. xylinus cellulose, or by adding an anti-solvent in which the vehicle dissolves but in which the cellulose is insoluble, such as water.

Suitable solvents include ionic liquids, aprotic solvents, isopropanol, and mixtures thereof. The term "ionic liquids" refers to materials that exist as ion pairs in the liquid state at room temperatures and include N-methylmorpholine-N-oxide; 1-ethyl-3-methylimidazolium chloride; 1-butyl-3-methylimidazolium chloride; 1-allyl-3-methylimidazolium chloride; and N-alkylpyridinium chlorides. In a more preferred form of the invention, the ionic liquid is 1-butyl-3 methylimidazolium chloride. Preferred aprotic solvents include dimethyl formamide, N,N,N',N'-tetramethylurea, and mixtures thereof. Another preferred solvent system consists of 1-butyl-3-methylimidazolium chloride and isopropanol mixtures containing from 0-20% by weight isopropanol depending on the final viscosity sought. Suitable anti-solvents will include any liquid that is compatible with a contact lens preparation procedure, that does not dissolve the G. xylinus cellulose and that when added to the viscous cellulose solution will precipitate the G. xylinus cellulose from the solution. Suitable anti-solvents include protic solvents, and most preferably, water.

In another preferred form of the invention, a viscosity enhancer will be used in any of the methods disclosed herein for forming contact lenses to achieve the desired flow characteristics of the vehicle carrying the G. xylinus cellulose, to form a contact lens of the desired thickness and/or to achieve other desired characteristics. In a preferred form of the invention the viscosity enhancer is a material that is compatible with the human eye and is miscible with the vehicle. In one preferred form of the invention the viscosity enhancer is isopropyl alcohol.

In a more preferred form of the invention, a quantity of the G. xylinus cellulose material will be added to 1-butyl-3-methylimidazolium chloride in preparation to forming a solution; this suspension is heated to dissolve the G. xylinus cellulose to form a viscous solution; the viscous solution is transferred to a mold of the desired shape by flowing the viscous solution into the mold. Water is added to the mold to precipitate the G. xylinus cellulose in the shape of a contact lens. In a more preferred form of the invention, a quantity of isopropanol will be added to the viscous solution to adjust its viscosity. The contact lens of the present invention will have a G. xylinus cellulose content by weight of from about 2.5-35%, more preferably from about 3%-20%, and most preferably from about 5%-15% by weight. The second component of the contact lens will be aqueous solutions to bring the weight percentage to 100%. The contact lens will have a permeability of at least 100 Barrers The contact lens with have a density of from about 0.980 g/cm$^3$ to about 1.05 g/cm$^3$, more preferably from about 0.990 g/cm$^3$ to about 1.20 g/cm$^3$, and most preferably about 1.00 g/cm$^3$. The contact lens will be wettable by aqueous solutions having from 0% solutes to solutes equivalent to 4 molar sodium chloride.

After the contact lens is removed from the mold it may undergo additional processing steps such as trimming, edge chamfering, cleaning, sterilization, hydration, polishing, coating with an antireflective coating, and packaging for shipment. In a preferred form of the invention the contact lens will be coated or imbibed with an adjuvant, for example a neutral alkane mineral oil, such as Drakeol-20™ or SOOTHE®, which augments and fortifies the oil layer of the tear film by reducing evaporation of the aqueous component of the tear film while lubricating the action of the eye lids.

In yet another preferred form of the invention, the contact lens can be coated or imbibed or otherwise associated with a pharmacological agent such as a drug, or biomolecule, which is delivered to the eye when placed in contact therewith. The delivery of the agent can be immediate or a controlled release over an extended period of time. In one preferred form of the invention, the pharmacological agent will be an antibiotic, antiviral, anti-inflammatory, nucleic acid and/or analgesic. In yet another preferred form of the invention, the contact lens will have a microchip, nanochip, microcircuit, or nanocircuit attached or otherwise associated with the contact lens to detect or monitor the presence of chemical substances, such as nerve agents, pollutants, toxins, poisons, pathogens, pollen, dust, or other substance that can impact the eye or the human wearing the contact lens.

In a preferred form of the invention, the contact lenses will be corrective of vision and can be single vision, bifocal, trifocal, and progressive. In another form of the invention, the peripheral edges to the lenses will be chamfered or beveled to round the peripheral edges so as to prevent snagging onto the eyelid wiper during blinking. The eyelid wiper is a line of squamous epithelium immediately anterior to the line of Marx that actually makes physical contact with the epithelial surface of the cornea and sclera. The remainder of the eyelid, particularly the upper lid containing Kessing's space, floats over a reservoir of mucus.

EXAMPLE

A Contact Lens from Dissolved *G. xylinus* Cellulose

*G. xylinus* cellulose was dissolved in 1-butyl-3-methylimidazolium chloride to a concentration of 7% cellulose by weight using mild microwave heating. The viscous solution obtained was then applied to a mold. The cellulose was precipitated as a clear material by treatment with isopropanol and then with water. Using this procedure, the synthetic contact lens spontaneously releases from the surface of the mold and was collected in distilled water. Over the next 48 hr, the residual solvent 1-butyl-3-methylimidazolium chloride diffused from the contact lens, yielding a preparation of a hydrated cellulose contact lens in water. The lens remained stable retaining its shape and its transparency when stored in water for a period of time in excess of eight weeks.

While the specific embodiments have been described, numerous modifications come to mind without significantly departing from the spirit of the invention and the scope of protection is only limited by the scope of the accompanying claims. This design is just one example of a pattern design having these favorable characteristics, and disclosure of it is merely one example of a design having its favorable characteristics, others of which are not significant departures from the spirit of the invention.

We claim:

1. A curved contact lens of a material comprising:
   A *Gluconacetobacter xylinus* cellulose material in an amount greater than 5% by weight to about 35% by weight; and
   water by weight in an amount less than 95% to about 65%.

2. The lens of claim 1 wherein the lens is dimensioned to correct defects in vision.

3. The lens of claim 1 wherein the lens has a permeability to air of at least about 100 Barrers.

4. The lens of claim 1 wherein the lens absorbs light at a wavelength of from 250 nm to about 400 nm.

5. A curved contact lens of a material comprising:
   A *Gluconacetobacter xylinus* cellulose material by weight of from about 1.5% to about 35%;
   water by weight of from about 65% to about 98.5%; and
   wherein the lens has a permeability to air of at least about 100 Barrers.

6. The lens of claim 5 wherein the lens is dimensioned to correct defects in vision.

7. The lens of claim 5 wherein the lens absorbs light at a wavelength of from 250 nm to about 400 nm.

8. A curved contact lens of a material comprising:
   A *Gluconacetobacter xylinus* cellulose material by weight of from about 1.5% to about 35%;
   water by weight of from about 65% to about 98.5%; and
   wherein the lens absorbs light at a wavelength of from 250 nm to about 400 nm.

9. The lens of claim 8 wherein the lens has a permeability to air of at least about 100 Barrers.

10. The lens of claim 8 wherein the lens is dimensioned to correct defects in vision.

* * * * *